F. W. ROLLER.
PRESSURE REGULATOR.
APPLICATION FILED AUG. 17, 1915.
1,185,347.
Patented May 30, 1916.
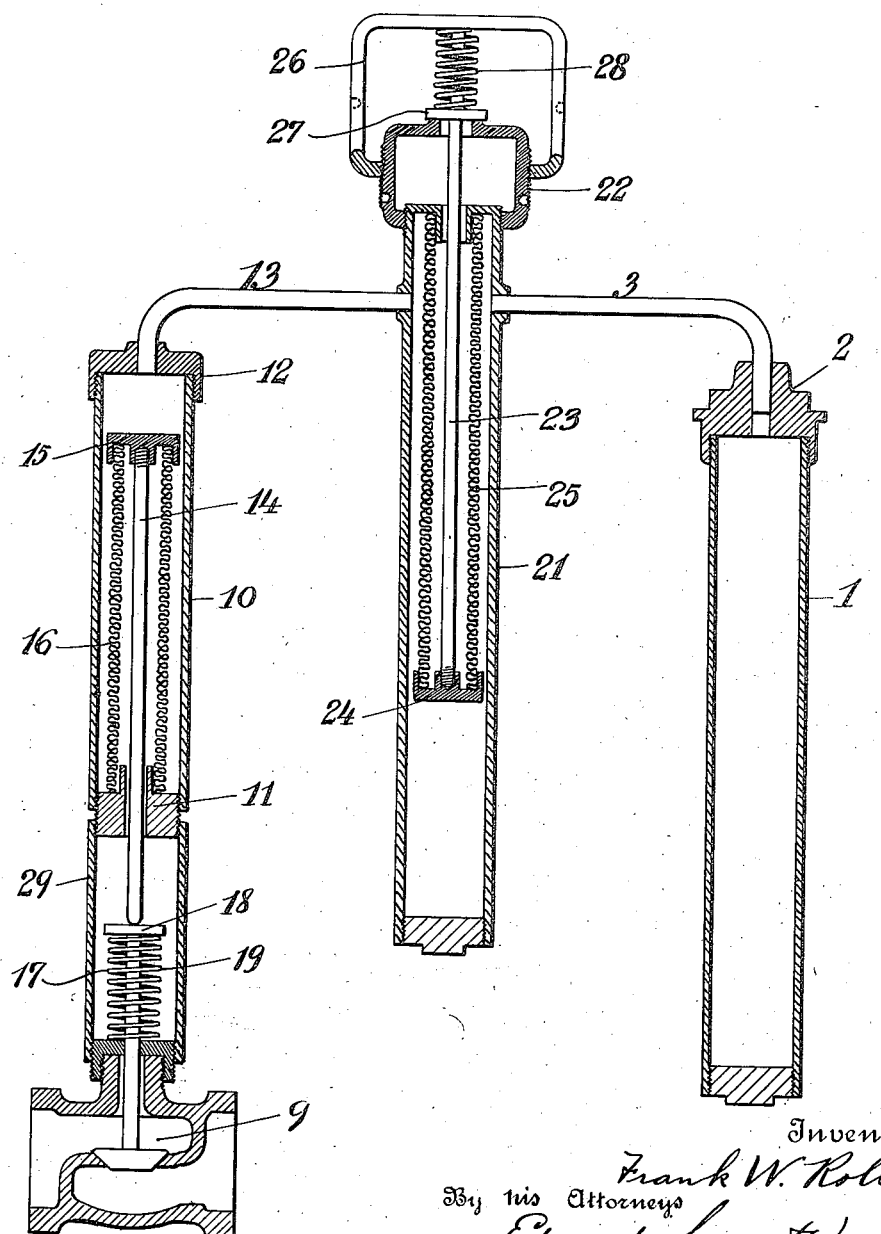
Inventor
Frank W. Roller,
By his Attorneys
Edwards, Sager & Wooster.

UNITED STATES PATENT OFFICE.

FRANK W. ROLLER, OF EAST ORANGE, NEW JERSEY, ASSIGNOR, BY MESNE ASSIGNMENTS, TO SARCO COMPANY, INC., A CORPORATION OF NEW YORK.

PRESSURE-REGULATOR.

1,185,347.

Specification of Letters Patent.

Patented May 30, 1916.

Application filed August 17, 1915. Serial No. 46,010.

*To all whom it may concern:*

Be it known that I, FRANK W. ROLLER, a citizen of the United States, residing at East Orange, in the county of Essex and State of New Jersey, have invented certain new and useful Improvements in Pressure-Regulators, of which the following is a full, clear, and exact specification.

My invention relates to an improvement in pressure regulators, and is particularly applicable to the control or regulation of the temperature of any medium at any particular location desired. It is also applicable to the regulation of pressure and has various other applications which will be understood by those skilled in the art.

The main objects of my invention are to provide a regulator which shall be reliable in operation, durable and simple in construction.

In accordance with one feature of my invention, I employ an inclosed pressure exerting medium and provide protective means for relieving the regulating system from excessive or abnormal pressures which otherwise might seriously impair or destroy the regulating means.

I also provide adjustable means whereby the regulation may be controlled as desired.

Other features and objects of my invention will be understood from the following description and accompanying drawing, in which the figure illustrates a vertical sectional view of regulating means embodying one form of my invention.

In the construction shown, my invention comprises three parts, the part at the right of the drawing being the portion located at the point where the temperature, in this particular embodiment, is to be maintained within predetermined limits.

The left-hand portion of the figure illustrates the means for controlling, by a valve, damper, or other suitable means, the supply of fuel or other medium for effecting the increase or decrease of temperature at the point to be controlled. It will be understood by those skilled in the art that these mediums may be controlled and that the change of temperature at the point to be controlled may be accomplished in various ways. As this forms no part of my invention, the particular means is not illustrated in the drawing.

The middle portion of the figure illustrates protective and adjustable means which serves to protect all parts of the regulator from excessive or abnormal pressures which otherwise might cause breakage or distention of the parts beyond proper limits and which might seriously interfere with the proper regulation of the system. I also provide means in this part for adjustment of the capacity of the pressure exerting medium for controlling the regulation as desired.

The right-hand portion of the figure comprises a cylindrical casing or tube 1 closed at its lower end and having a cap 2 at its upper end. A pipe connection 3 extends from this cap.

A valve 9 is shown at the left of the figure, the opening of which causes a supply of fuel or other medium for increasing the temperature of the medium to be controlled at the location of the part at the right-hand portion of the drawing. The valve operating means is shown, in this instance, as comprising a cylindrical casing 10 closed at its lower end by an end piece 11 and at its upper end by a cap 12, a pipe connection 13 extending from this cap. A rod 14 extends freely through the end piece 11 and has secured to its upper end an end piece 15. Between the end pieces 11 and 15 extends an extensible tube 16, preferably of corrugated metal. This extensible tubing may be of any suitable form of construction to withstand the pressures and temperatures required in the particular application of my invention. The ends of the tube 16 are hermetically sealed to its end pieces. The lower end of the rod 14 engages the valve stem 17 and may be directly connected therewith. Between the stop 18 on the valve stem or rod 14, and a fixed point such as the valve casing 9, is located a spring 19 which exerts a pressure tending to open the valve 9. A casing 20 incloses the spring 19 and forms a suitable supporting part between the valve and the lower end of the casing 10.

The protective means, in this instance, comprises a cylindrical casing 21, the lower end of which is closed and its upper end carries a cap 22 having an adjustable threaded connection with the casing 21. A rod 23 freely passes through the cap 22 and has an end piece 24 secured to its lower end. Between this end piece and the upper part of the casing 21 is another extensible tube 25 of the form above described, the ends of the tube 25 being hermetically sealed at its ends. Another cap 26 has an adjustable threaded connection with the outside of cap 22. A flange 27 seats on the top of cap 22, the rod 23 engages the bottom of the flange through an opening in cap 22. A spring 28 is located between the flange 27 and the top of cap 26 which tends to seat the flange against the cap 22 and hold the rod 23 in the position shown.

Pipes 3 and 13 interconnect the casings 1, 21 and 10, placing all three casings in direct connection. Suitable expansible fluid, which may be a gas or liquid, fills the casing 1 and the spaces in casings 21 and 10, which are outside of the extensible tubes 25 and 16.

In operation, assuming that the valve 9 is open, the supply of fuel, steam or other heating medium, passes freely through the valve 9 and causes the temperature of the medium, where the right-hand portion of the regulator is located, to be gradually raised. The increase in temperature causes the fluid within the casing 1 to gradually expand and the fluid passes through the pipe connections to the other casings and causes increase of pressure in the system. The increase of pressure causes the head 15 of the tube 16 to be gradually forced downwardly, gradually closing the valve 9 against the pressure of spring 19, and gradually cutting off the supply of fuel, steam, or other medium. If the pressure continues to increase the valve 9 becomes fully closed. If the pressure continues to increase beyond the amount which fully closes the valve 9, or beyond the amount which causes the movement of the valve to its final position, the increased pressure then acts, at a pressure dependent upon the adjustment of cap 26 in relation to cap 22, to raise the lower end of tube 25 against the pressure of spring 28. The pressure increase beyond that at which the valve 9 attains its final position is thereby prevented from attaining abnormally high pressures, the action of the middle portion of the figure serving to provide a gradually increasing capacity for the expansible fluid and thus permitting comparatively small increases of pressure beyond that attained at the final position of the valve. The regulating means is thereby protected from abnormal pressure increases and thus has a relief or safety protection against abnormal strains. When the temperature of the medium in casing 1 gradually decreases, due to the cutting off or reduction of the heating, the reverse action takes place, the spring 28 causing the tube 25 to be extended until the flange 27 seats against the cap 22 and the spring 19 will cause the head 15 of the tube 16 to be raised and the valve 9 gradually opened.

The above described operations continue to take place in accordance with the required changes in the system and the adjustments of the parts.

By adjustment of the cap 26 in relation to cap 22 the pressure at which spring 28 begins to yield against the opposing pressure, may be adjusted to any desired amount depending upon the particular requirements or variables of the system.

The temperature to be maintained at the locality of the medium where the right-hand or thermostatic element of the regulator is positioned may be readily adjusted to suit particular requirements by adjustment of cap 22 with relation to casing 21, thus causing a lengthening or shortening of the tube 25 when the flange 27 is seated against the cap 22. Adjustment causing lengthening of tube 25 to any desired position will cause the temperature of the medium to be controlled to be maintained at a higher average temperature while shortening of the tube 25 will cause the opposite effect. I thus unite with the adjustable protective means, a means for adjustment of the temperature to be controlled.

My invention may be embodied in various forms of construction without departing from the scope thereof.

Having thus described my invention, I declare that what I claim as new and desire to secure by Letters Patent, is:—

1. In a regulator, a thermostatic element comprising a casing, an expansible fluid within said casing, a second casing connected with the first casing, an expansible element within said second casing and movable in response to pressure changes of said fluid, a regulating element, the movement of which is controlled by said expansible element, a third casing connected with both of said two casings, an expansible element within said third casing subjected to the pressure of said fluid, yieldable means tending to oppose movement of said last named expansible element, a stop to limit the opposing tendency of said yieldable means, and adjustable means for adjusting the pressure exerted by said yieldable means.

2. In a regulator, a pressure controlling thermostat, a casing, an expansible element within said casing, a regulating element controlled by the expansion and contraction of said expansible element, a second casing, an expansible element in said second casing for varying the capacity of the space occupied by the pressure exerting medium, means for adjusting said last named expansible element to any desired amount, yieldable means tending to hold said last named expansible element in a certain position but to permit change of capacity upon the exertion of pressure beyond a predetermined amount, and means for adjusting the pressure exerted by said yieldable means to any desired amount.

3. In a regulator, a fluid container a part of which is adapted to be acted upon by heat and to act as a thermostatic element, two expansible members within said container, a regulating element connected to one such expansible member and adapted to be actuated thereby, yielding means connected to the other such expansible member and adapted to oppose a definite force to its displacement, means to adjust the magnitude of such opposing force, and means to adjust the normal displacement volume of the last named expansible member.

4. In a regulator, a fluid container a part of which is adapted to be acted upon by heat and to act as a thermostatic element, two expansible members within such container, respective springs opposing the contraction of said expansible members, a regulating element connected to one such expansible member and adapted to be actuated thereby, a stop to limit the action of the other spring, means to adjust the position of said stop, and means to adjust the normal tension of the associated spring.

5. In a regulator, a fluid container a part of which is adapted to be acted upon by heat and to act as a thermostatic element, an expansible member within such container, a regulating element connected thereto and adapted to be actuated thereby, means to adjust the normal volume of said container, a spring adapted to yield to excessive pressure within the container and thereby increase its volume, and means to adjust said spring.

6. In a regulator, a thermostatic element comprising a casing, an expansible fluid within said casing, a second casing connected with the first casing, an expansible element within said second casing and movable in response to pressure changes of said fluid, a regulating element, the movement of which is controlled by said expansible element, a third casing connected with both of said two casings, an expansible element within said third casing subjected to the pressure of said fluid, yieldable means tending to oppose movement of said last named expansible element, a stop to limit the opposing tendency of said yieldable means, adjustable means for adjusting the pressure exerted by said yieldable means, and means to adjust the normal volume of said last named expansible element.

7. In a regulator, a fluid container a part of which is adapted to be acted upon by heat and to act as a thermostatic element, a regulating element adapted to be actuated by pressure within said container, an expansible relief and volume-adjusting member also within said container, a spring acting on said expansible member, a stop to limit such action, a fixed abutment for the spring and means to adjust the said stop and the said abutment.

8. In a regulator, a fluid container, a part of which is adapted to be acted upon by heat and to act as a thermostatic element, a regulating element adapted to be actuated by pressure within said container, said container comprising a chamber, an expansible member in said chamber with one end connected to the chamber wall, a rod extending through the chamber wall and connected to the other end of the expansible member, a spring acting on said rod, a stop adjustably mounted on the chamber wall and adapted to limit the action of the spring, and an adjustable abutment for said spring.

9. In a pressure regulator, a fluid container, an expansible member therein, a rod extending through the container wall and attached at its inner end to said expansible member, a spring acting against the exterior end of said rod, an adjustable stop to limit the movement of said spring against said rod, and an adjustable abutment for the opposite end of said spring.

In testimony whereof I affix my signature in presence of two witnesses.

FRANK W. ROLLER.

Witnesses:
  M. W. ISREL,
  L. K. SAGER.